(12) United States Patent
Rahman et al.

(10) Patent No.: US 8,948,165 B2
(45) Date of Patent: *Feb. 3, 2015

(54) IP TELEPHONY ON A HOME NETWORK DEVICE

(71) Applicant: Samsung Electronics Company, Ltd., Suwon, Gyeong gi-Do (KR)

(72) Inventors: Mahfuzur Rahman, San Jose, CA (US); Alan Messer, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/142,593

(22) Filed: Dec. 27, 2013

(65) Prior Publication Data

US 2014/0112208 A1  Apr. 24, 2014

Related U.S. Application Data

(63) Continuation of application No. 12/357,974, filed on Jan. 22, 2009, now Pat. No. 8,644,304.

(51) Int. Cl.
*H04L 12/66* (2006.01)
*H04M 1/64* (2006.01)
*H04M 11/00* (2006.01)
*H04M 1/56* (2006.01)
*H04M 15/06* (2006.01)
*H04L 29/06* (2006.01)
*H04M 3/54* (2006.01)

(52) U.S. Cl.
CPC ............... *H04L 65/40* (2013.01); *H04L 12/66* (2013.01); *H04L 65/1053* (2013.01); *H04M 3/54* (2013.01)
USPC ................... 370/356; 370/395.2; 370/395.52; 379/88.17; 379/100.15; 379/142.07; 379/142.16

(58) Field of Classification Search
USPC ......... 370/356, 395.2, 395.52, 389, 392, 401, 370/395.21; 379/88.17, 100.12–100.15, 379/142.07, 142.15, 142.16
See application file for complete search history.

(56) References Cited

U.S. PATENT DOCUMENTS

| | | | |
|---|---|---|---|
| 7,515,698 B2 | 4/2009 | Van Wyk et al. | |
| 8,270,417 B2 | 9/2012 | Kohi et al. | |
| 8,330,862 B2 | 12/2012 | Matsuo et al. | |
| 2007/0078987 A1 | 4/2007 | Walker et al. | |
| 2007/0121584 A1 | 5/2007 | Qiu et al. | |
| 2007/0203979 A1 | 8/2007 | Walker et al. | |

OTHER PUBLICATIONS

Walker, M.R. et al. "CEA 2014 Overview", Proceedings of the ATIS ITU-T FG IPTV Interoperability Forum, 24 Jan. 2007, pp. 1-10, Digital Home Group Intel, CEA, Untied States.
U.S. Non-Final Office Action for U.S. Appl. No. 12/357,974 mailed Apr. 2, 2012.
U.S. Final Office Action for U.S. Appl. No. 12/357,974 mailed May 7, 2012.
U.S. Notice of Allowance for U.S. Appl. No. 12/357,974 mailed Oct. 3, 2013.

*Primary Examiner* — Benjamin H Elliott, IV
(74) *Attorney, Agent, or Firm* — Sherman IP LLP; Kenneth L. Sherman; Hamavathy Perumal

(57) ABSTRACT

In one embodiment, a method for providing voice communications in a packet switched network protocol through a home network is provided, the method comprising: receiving, at a first home network device, an incoming call in the packet switched network protocol; notifying a second home network device of the incoming call; receiving an indication from the second home network device that the second home network device accepts the call; and forwarding the incoming call to the second home network device.

30 Claims, 4 Drawing Sheets

IP TELEPHONY ON A HOME NETWORK DEVICE

CROSS-REFERENCE TO RELATED APPLICATIONS

This application is a continuation of U.S. patent application Ser. No. 12/357,974, filed on Jan. 22, 2009, incorporated herein by reference.

BACKGROUND OF THE INVENTION

1. Field of the Invention

The present invention relates generally to home networking. More specifically, the present invention relates to IP telephony on a home networking device such as a television.

2. Description of the Related Art

Home networking has advanced from the early days of merely linking computers and printer to the modem home network, which can include mobile devices, televisions, set-top boxes, refrigerators, etc.

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

Voice over Internet Protocol (VoiP) is a general term for a family of transmission technologies for delivery of voice communications over the Internet or other packet-switched networks. Other terms frequently encountered and synonymous with VoiP are IP telephony and Internet telephony, as well as voice over broadband, broadband telephony, and broadband phone, when the network connectivity is available over broadband Internet access.

VoiP systems usually interface with the traditional public switched telephone network (PSTN) to allow for transparent phone communications worldwide.

VoiP can be a benefit for reducing communication and infrastructure costs by routing phone calls over existing data networks and avoiding duplicate network systems. Skype and Vonage are notable service provider examples that have achieved widespread user and customer acceptance and market penetration.

Voice-over-IP systems carry telephony speech as digital audio, typically reduced in data rate using speech data compression techniques, packetized in small units of typically tens of milliseconds of speech, and encapsulated in a packet stream over IP.

The Session Initiation Protocol (SIP) is a VoiP signaling protocol, widely used for setting up and tearing down multimedia communication sessions such as voice and video calls over the Internet. The protocol can be used for creating, modifying and terminating two-party (unicast) or multiparty (multicast) sessions consisting of one or several media streams. The modification can involve changing addresses or ports, inviting more participants, adding or deleting media streams, etc.

SIP clients typically use TCP or UDP (typically on port 5060 and/or 5061) to connect to SIP servers and other SIP endpoints. SIP is primarily used in setting up and tearing down voice or video calls.

A motivating goal for SIP was to provide a signaling and call setup protocol for IF-based communications that can support a superset of the call processing functions and features present in the public switched telephone network (PSTN). SIP by itself does not define these features; rather, its focus is call-setup and signaling. However, it was designed to enable the construction of functionalities of network elements designated Proxy Servers and User Agents. These are features that permit familiar telephone-like operations: dialing a number, causing a phone to ring, hearing ringback tones or a busy signal. Implementation and terminology are different in the SIP world but to the end-user, the behavior is similar.

SIP-enabled telephony networks can also implement many of the more advanced call processing features present in Signaling System 7 (SS7), though the two protocols themselves are very different. SS7 is a centralized protocol, characterized by a complex central network architecture and dumb endpoints (traditional telephone handsets). SIP is a peer-to-peer protocol, thus it requires only a simple (and thus scalable) core network with intelligence distributed to the network edge, embedded in endpoints (terminating devices built in either hardware or software). SIP features are implemented in the communicating endpoints (i.e. at the edge of the network) contrary to traditional SS7 features, which are implemented in the network.

Recently, VoiP has been extended to mobile devices such as cellular phones. There are several methodologies by which a mobile handset can be integrated into a VoiP network. One implementation turns the mobile device into a standard SIP client, which then uses a data network to send and receive SIP messaging, and to send and receive RTP for the voice path. This methodology of turning a mobile handset into a standard SIP client requires that the mobile handset support, at minimum, high speed IP communications. In this application, standard VoiP protocols (typically SIP) can be used over any broadband IP-capable wireless network connection.

Another implementation of mobile integration uses a softswitch like gateway to bridge SIP and RTP into the mobile network's SS7 infrastructure. In this implementation, the mobile handset continues to operate as it always has (as a GSM or CDMA based device), but now it can be controlled by a SIP application server which can now provide advanced SIP based services to it. Several vendors offer this kind of capability today.

Mobile VoiP will require a compromise between economy and mobility. For example, Voice over Wi-Fi offers potentially free service but is only available within the coverage area of a Wi-Fi Access Point. High speed services from mobile operators may have better audio quality and capabilities for metropolitan-wide coverage including fast handoffs among mobile base stations, yet it will cost more than the typical Wi-Fi-based VoiP service.

Mobile VoiP will become an important service in the coming years as device manufacturers exploit more powerful processors and less costly memory to meet user needs for ever-more "power in their pocket". Smartphones are capable of sending and receiving email, browsing the web and in some cases allowing a user to watch TV.

As UPnP grows in popularity, more and more devices in the home are going to be networked. One particularly attractive notion is to integrate a digital television set into a UPnP network to allow users to access network functions through their television.

SUMMARY OF THE INVENTION

In one embodiment, a method for providing voice communications in a packet switched network protocol through a home network is provided, the method comprising: receiving, at a first home network device, an incoming call in the packet switched network protocol; notifying a second home network device of the incoming call; receiving an indication from the second home network device that the second home network device accepts the call; and forwarding the incoming call to the second home network device.

In another embodiment, a method for providing voice communications in a packet switched network protocol through a home network is provided, the method comprising: receiving, from a first home network device, a notification of an incoming call in the packet switched network protocol received at the first home network device, wherein the notification is received at a second home network device; presenting an interface to a user of the second home network device, the interface allowing the user to accept or reject the incoming call; receiving an indication from the user as to whether the user accepts or rejects the incoming call; sending the indication from the second home network device to the first home network device; and if the user accepts the incoming call, receiving the incoming call from the first home network device and initiating two way communications for the call.

In another embodiment, a cell phone is provided comprising: a memory; a processor; a remote user interface server; a packet switched network protocol application; wherein the packet switched network protocol application is configured to receive an incoming call in the packet switched network protocol and communicate the presence of the incoming call to the remote user interface server; and wherein the remote user interface server is configured to: notify a remote user interface client on a television of the incoming call; receive an indication from the remote user interface client that the television accepts the call; and forward the incoming call to the remote user interface client.

In another embodiment, a television is provided comprising: a memory; a processor; and a remote user interface client configured to: receive, from a remote user interface server located on a cell phone, a notification of an incoming call in a packet switched network protocol received at the cell phone; present an interface to a user of the television, the interface allowing the user to accept or reject the incoming call; receive an indication from the user as to whether the user accepts or rejects the incoming call; send the indication o the remote user interface server; and if the user accepts the incoming call, receive the incoming call from the remote user interface server and initiate two way communications for the call.

DETAILED DESCRIPTION OF SPECIFIC EMBODIMENTS

Figure 1:
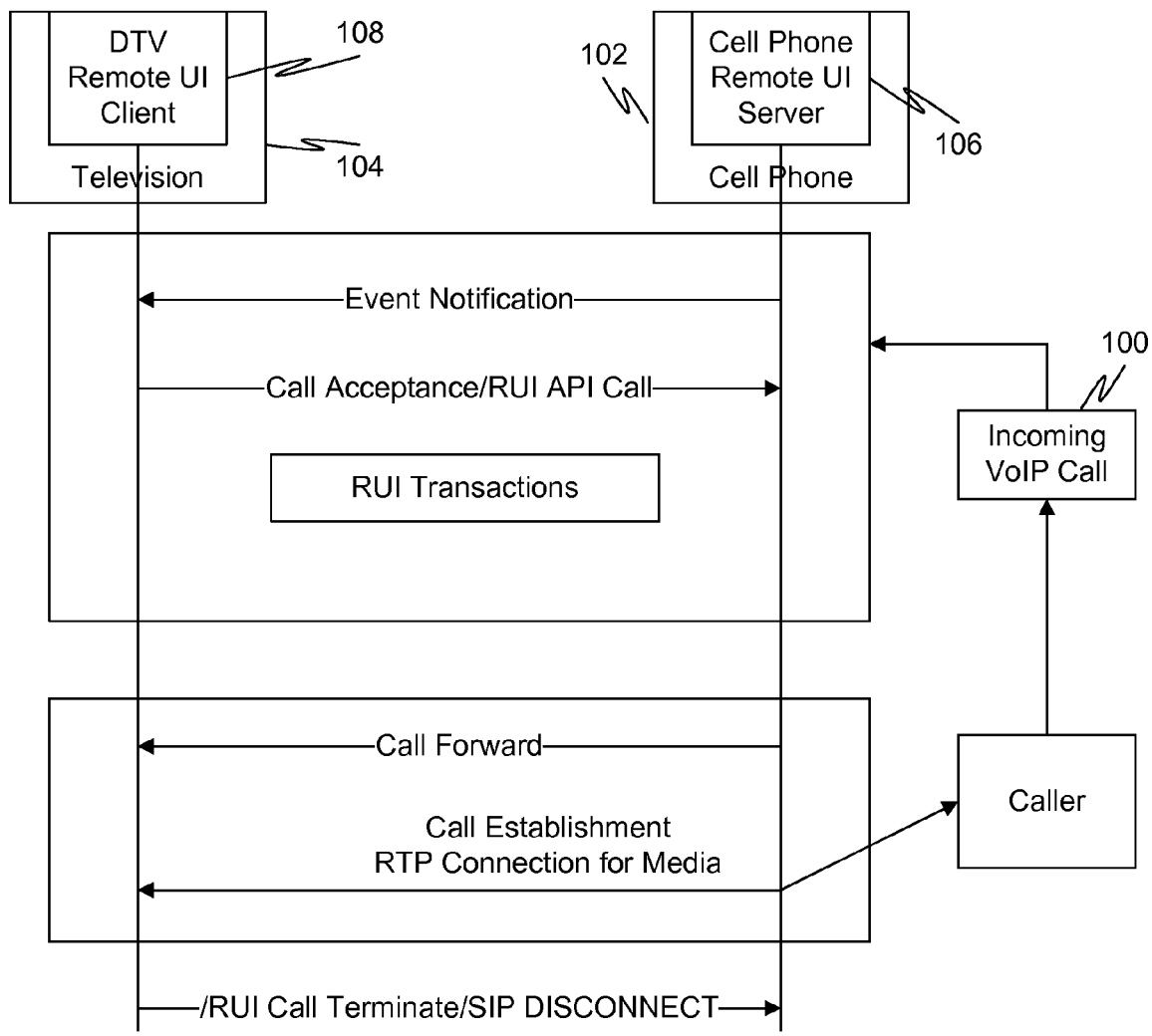
FIG. 1 is a diagram illustrating a system for providing VoiP functionality to a home network device in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The inventors of the present invention recognized that extending VoiP services from a cell phone to another device in a home network, such as a digital television, provides unique challenges. Nevertheless, the inventors recognized that it would be advantageous if VoiP functionality utilized by the cell phone could be controlled through the television, including making and receiving VoiP calls.

The present invention provides a mechanism for initiating and receiving IP telephone calls on a television. It should be noted that while the present disclosure discusses the use of the invention for a television, the invention may be extended to other home networking devices as well. Furthermore, while the present disclosure focuses on televisions as UPnP devices, the invention could be extended to remote user interfaces operating on non UPnP devices as well, and nothing in this document shall be construed as limiting the scope of the invention to UPnP devices, unless expressly stated otherwise.

In an embodiment of the present invention, VoiP calls to and from a digital television are enabled using a remote user interface. A binding is performed between the remote user interface and the SIP protocol in order to realize such VoiP calls. An incoming VoiP call to a mobile device such as a cell phone is forwarded to the digital television using the remote user interface. Here, the cell phone acts as a Remote User Interface (RUI) server and the RUI client runs on the digital television. An RUI enables an application user interface to be remoted to a device other tan the device where the application logic is running CEA 2014 is an RUI standard protocol developed by CEA. When the RUI client in the digital television receives an event from the RUI server for an incoming call, the client calls a RUI Javascript API to establish the call between the caller and the SIP client in the digital television. The Javascript API translates to low level SIP transactions to actually establish the call. The RUI client at the digital television can terminate the call by invoking a Javascript API which translates to a low level SIP DISCONNECT method. The RUI client at the digital television also can make an outgoing call by invoking a Javascript API which translates to an SIP INVITE method call.

FIG. 1 is a diagram illustrating a system for providing VoiP functionality to a home network device in accordance with an embodiment of the present invention. An incoming call 100 to a cell phone 102 is forwarded to the digital television 104 through a remote UI. The remote UI includes a remote UI server 106 located on the cell phone 102 and a remote UI client 108 located on the digital television 104. The notification of the incoming call is initiated by a RUI eventing mechanism. Once the notification is received by the RUI client on the digital television, the RUI client accepts the call. The call is then forwarded from the cell phone 102 to the digital television 104 and a direct SIP connection is established between a SIP client located on cell phone 102 and an SIP client located on the digital television 104. The digital television 104 terminates the call by invoking a Javascript API, which is translated to a low level SIP DISCONNECT message. The digital television and cell phone may include a processor and memory to facilitate the described functionality.

Figure 2:
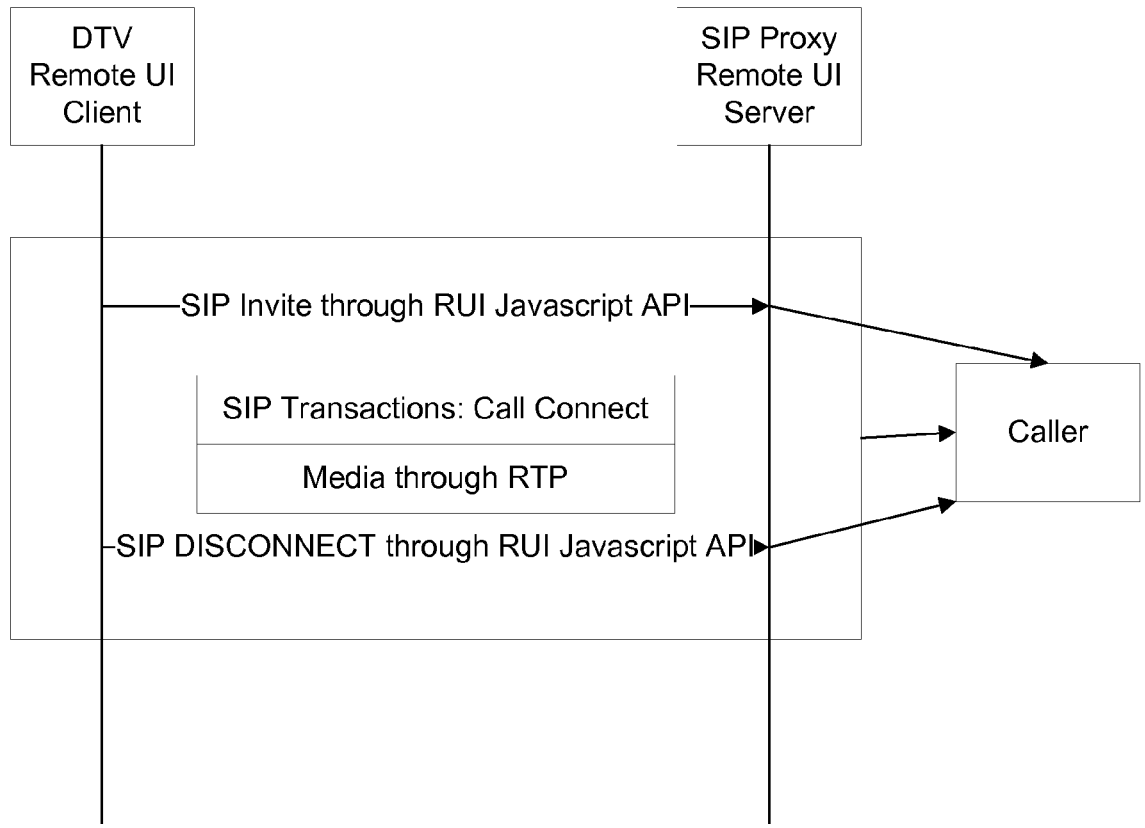
FIG. 2 is a diagram illustrating a system for providing VoiP functionality to a home network device in accordance with another embodiment of the present invention.

FIG. 2 is a diagram illustrating a system for providing VoiP functionality to a home network device in accordance with another embodiment of the present invention. Here, the RUT client at the digital television invokes a Javascript API to initiate a call which is then translated to an SIP INVITE command to initiate the call. The digital television and cell phone may include a processor and memory to facilitate the described functionality.

For both scenarios, in an embodiment of the present invention, the media flow for the VoiP is performed by Real-Time Protocol (RTP), which is a standardized packet format for delivering audio and video over a network, as specified by the SIP protocol, and is independent of RUI transactions.

The above description assumes a Remote UI based approach. Another approach is available that utilizes UPnP Device Control Protocol (DCP). In this approach, media transport between the digital television and the cell phone is realized by the DCP. Media to and from the caller is forwarded by the cell phone on the digital television. It should be noted that the media flow does not need to be RTP based. The communication between the cell phone and the digital television will be based on UPnP, hence no SIP messages are used. Both the cell phone and the television can run a UPnP service that allow the two devices to communicate with each other through DCP.

Yet another approach is feasible that uses a combination of UPnP DCP and RUI. Here, SIP can be used for low level VoiP communications while UPnP DCP will be used for high level communication between the user and the VoiP application, such as accepting the call, disconnecting the call, etc., which will later be translated to SIP messages.

CalleriD technology is integrated into VoiP such that the identify of the caller may be easily determined and presented to the user prior to accepting or rejecting an incoming call. In an embodiment of the present invention, CalleriD technology is integrated into the invention by transporting the CalleriD information from the remote UI server to the remote UI client displaying the CalleriD of an incoming call on the digital television. The user can then use the television remote, for example, to accept or reject a call. Similar functionality can be implemented to identify outgoing calls as well.

Furthermore, in an embodiment of the present invention, presence information is transmitted from the cell phone to the other UPnP device such as the digital television. Presence information includes information regarding whether certain users are available at the moment. For example, SIP provides for the ability to determine in real time whether a "buddy" in the cell phone user's frequent contacts list is available (e.g., cell phone is online and connected to the network, or available for text messaging, etc). This presence information is then pushed from the cell phone to the digital television using the RUI. This allows, for example the user to see a list of friends who are available to receive a call or text message prior to initiating a call to one of the friends.

In another embodiment of the present invention, security is implemented on the digital television to prevent unauthorized users from making or receiving calls and or obtaining presence information. The security may be, for example, in the form of a password that needs to be entered by the authorized user before access is granted to these services.

Figure 3:
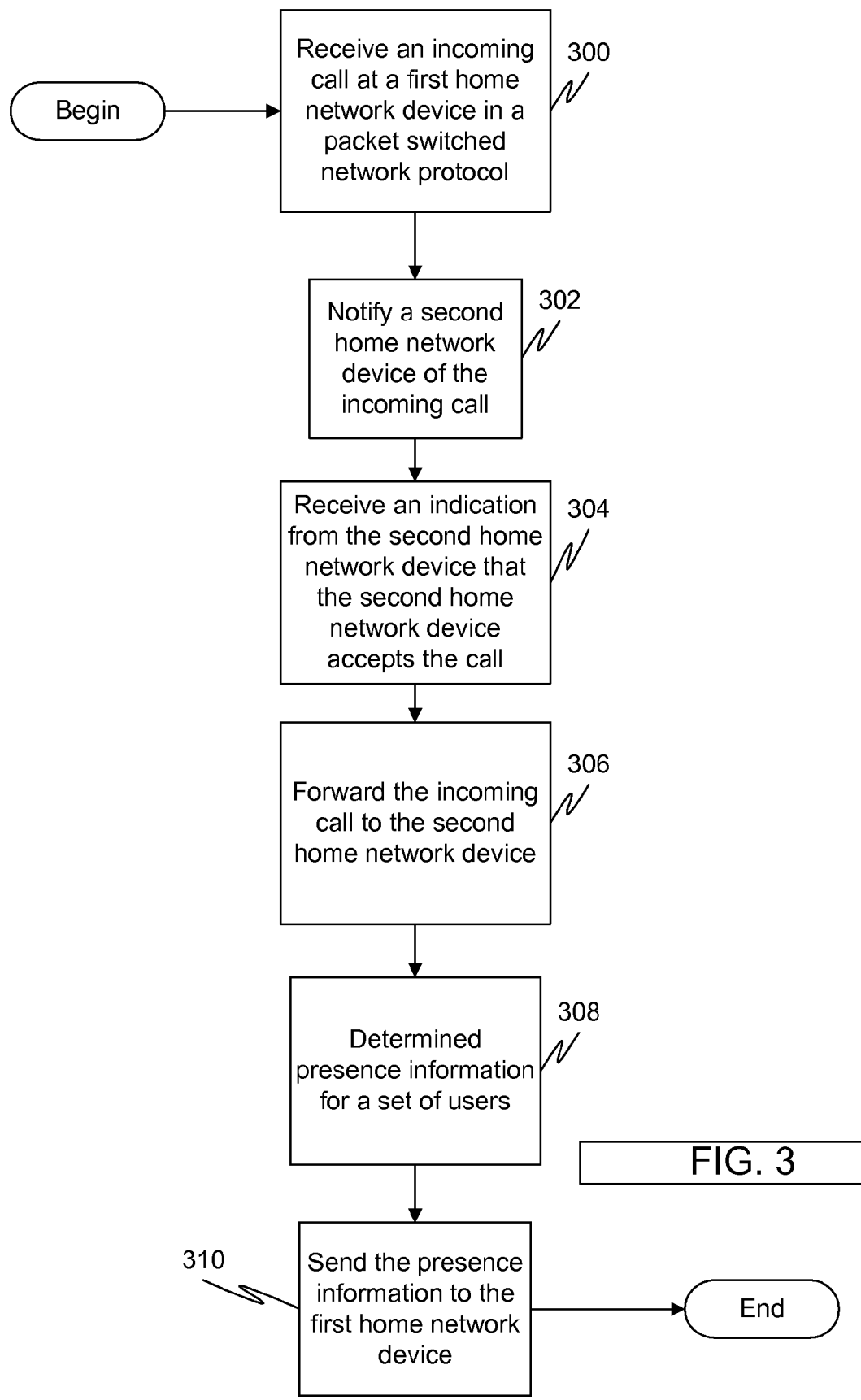
FIG. 3 is a flow diagram illustrating a method for providing voice communications in a packet switched network protocol through a home network in accordance with an embodiment of the present invention.

FIG. 3 is a flow diagram illustrating a method for providing voice communications in a packet switched network protocol through a home network in accordance with an embodiment of the present invention. This method describes the process flow that would occur on the "server side" of the home network. For example, if the home network includes a cell phone and a television, the cell phone would represent the "server side" for voice communications and thus this method would operate on the cell phone. The packet switched network protocol can be any packet switched network protocol but in one implementation voice communications are performed over the packet switched network protocol using the VoiP protocol.

At 300, an incoming call is received at a first home network device in a packet switched network protocol. As described above, the first home network device may be a cell phone. At 302, a second home network device is notified of the incoming call. As described above, the second home network device may be a television. In one implementation, the notifying includes using a remote user interface server on the first home network device to send a notification to a remote user interface client on the second home network device. This may be performed through SIP. In another implementation, the notifying is performed via UPnP. At 304, an indication is received from the second home network device that the second home network device accepts the call. In one implementation, the receiving includes receiving an indication at a remote user interface server. This may be performed through SIP. In another implementation, the receiving is performed through UPnP. At 306, the incoming call is forwarded to the second home network device. In one implementation, the forwarding includes forwarding the incoming call by sending the incoming call from a remote user interface server on the first home network device to a remote user interface client on the second home network device. This may be performed through SIP. In another implementation, the forwarding is performed through UPnP.

At 308, presence information for a set of users may be determined. At 310, the presence information may be sent to the first home network device.

Figure 4:
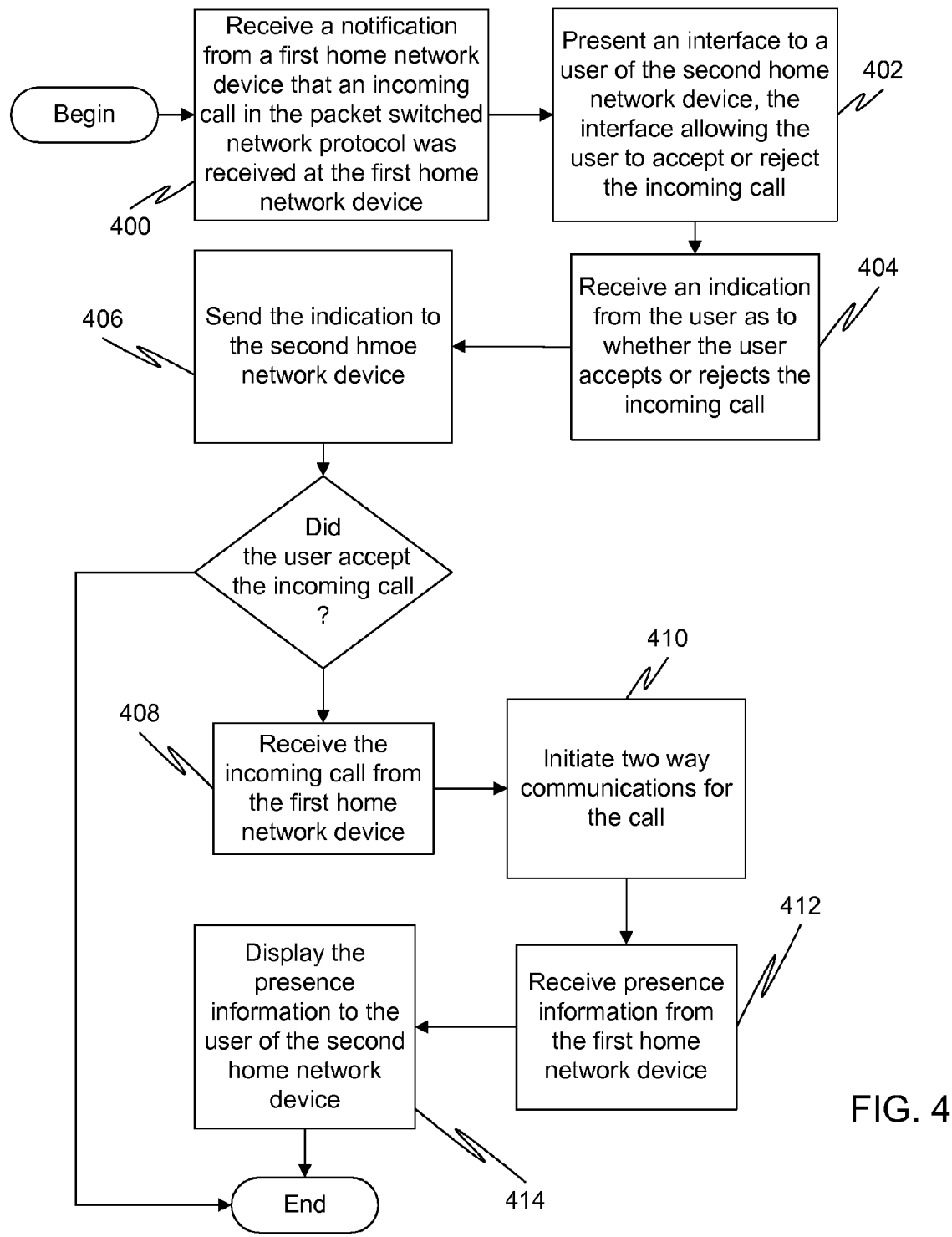
FIG. 4 is a flow diagram illustrating a method for providing voice communications in a packet switched network protocol through a home network in accordance with another embodiment of the present invention.

FIG. 4 is a flow diagram illustrating a method for providing voice communications in a packet switched network protocol through a home network in accordance with another embodiment of the present invention. This method describes the process flow that would occur on the "client side" of the home network. For example, if the home network includes a cell phone and a television, the television would represent the "client side" for voice communications and thus this method would operate on the television. The packet switched network protocol can be any packet switched network protocol but in one implementation the voice communications are performed over the packet switched network protocol using the VoiP protocol.

At 400, a notification is received from a first home network device that an incoming call in the packet switched network protocol was received at the first home network device. In one implementation, this receiving includes using a remote user interface client on the second home network device to receive the notification from a remote user interface server on the first home network device. This may be performed through SIP. In another implementation, this receiving is performed through UPnP. At 402, an interface is presented to a user of the second home network device, the interface allowing the user to accept or reject the incoming call. At 404, an indication is received from the user as to whether the user accepts or rejects the incoming call. At 406, the indication is sent from the second home network device to the first home network device. In one implementation, the sending includes sending the indication from a remote user interface client on the second home network device to a remote user interface server on the first home network device. This may be performed through SIP. In another implementation, this sending is performed through UPnP. At 408, if the user accepts the incoming call, the incoming call is received from the second home network device. In one implementation, the receiving the incoming call includes receiving the incoming call at the remote user interface client from the remote user interface server. This may be performed through SIP. In another implementation, this receiving is performed through UPnP. At 410, two way communications are initiated for the call.

At 412, presence information may be received from the first home network device. At 414, the presence information may be displayed to the user of the second home network device.

Although only a few embodiments of the invention have been described in detail, it should be appreciated that the invention may be implemented in many other forms without departing from the spirit or scope of the invention. Therefore, the present embodiments should be considered illustrative and not restrictive, and the invention is not to be limited to the details given herein, but may be modified within the scope and equivalents of the appended claims.

What is claimed is:

1. A method for providing voice communications in a packet switched network protocol through a home network, the method comprising:
   receiving, at a first home network device belonging to the home network, an incoming call in the packet switched network protocol;
   notifying a second home network device belonging to the home network of the incoming call by using an eventing mechanism of a first protocol utilized by a server on the first home network device to a send a notification to the second home network device;
   receiving an indication from the second home network device that the second home network device accepts the incoming call; and
   forwarding, from the first home network device, the incoming call to the second home network device via a second protocol different than the first protocol, wherein the second protocol is a peer-to-peer signaling protocol mechanism other than the eventing mechanism of the server.

2. The method of claim 1, wherein voice communications in the packet switched network protocol are performed using Voice over Internet Protocol (VoIP).

3. The method of claim 1, wherein the forwarding is performed through Session Initiation Protocol (SIP).

4. The method of claim 1, wherein communications between the first home network device and the second home network device are performed via Universal Plug and Play (UPnP) protocol.

5. The method of claim 1, wherein the receiving and the notifying are performed via Universal Plug and Play (UPnP) protocol while the forwarding is performed via Session Initiation Protocol (SIP).

6. The method of claim 1, further comprising:
   receiving, from the second home network device, a disconnect message for the incoming call generated by a Javascript Application Program Interface (API).

7. The method of claim 1, wherein the first home network device is a cell phone.

8. The method of claim 1, wherein the second home network device is a television.

9. The method of claim 1, further comprising:
   determining presence information for a set of users; and
   sending the presence information to the first home network device.

10. A method for providing voice communications in a packet switched network protocol through a home network, the method comprising:
    receiving, from a first home network device belonging to the home network, a notification of an incoming call in the packet switched network protocol received at the first home network device, wherein the notification is received at a second home network device belonging to the home network through an eventing mechanism of a first protocol utilized by a server on the first home network device;
    presenting an interface to a user of the second home network device, as directed by the server, the interface allowing the user to accept or reject the incoming call;
    receiving an indication from the user as to whether the user accepts or rejects the incoming call;
    sending the indication from the second home network device to the first home network device; and
    if the user accepts the incoming call, receiving the incoming call from the first home network device and initiating two way communications for the incoming call, wherein the two way communications take place via a second protocol different than the first protocol, wherein the second protocol is a peer-to-peer signaling protocol.

11. The method of claim 10, wherein communications between the first home network device and the second home network device are performed through Session Initiation Protocol (SIP).

12. The method of claim 10, wherein communications between the first home network device and the second home network device are performed via Universal Plug and Play (UPnP) protocol.

13. The method of claim 10, wherein the receiving the notification and the sending the indication are performed via Universal Plug and Play (UPnP) protocol while the receiving the incoming call is performed via Session Initiation Protocol (SIP).

14. The method of claim 10, further comprising:
    upon completion of the incoming call, generating a disconnect message with a Javascript Application Program Interface (API) and forwarding the disconnect message to the first home network device.

15. The method of claim 10, further comprising:
receiving, from the first home network device, presence information regarding a set of users;
displaying the presence information to a user of the second home network device.

16. An apparatus, comprising:
a memory;
a processor;
a server; and
a packet switched network protocol application;
wherein the packet switched network protocol application is configured to receive an incoming call in the packet switched network protocol and communicate the presence of the incoming call to the server; and
wherein the server is configured to:
notify a network device belonging to the same home network as the server of the incoming call via an eventing mechanism of a first protocol;
receive an indication from the network device that the network device accepts the incoming call; and
forward the incoming call to the network device via a second protocol different than the first protocol, wherein the second protocol is a peer-to-peer signaling protocol.

17. The apparatus of claim 16, wherein voice communications in the packet switched network protocol are performed using Voice over Internet Protocol (VoIP).

18. The apparatus of claim 16, wherein the server forwards the incoming call through Session Initiation Protocol (SIP).

19. The apparatus of claim 16, wherein communications between the apparatus and the network device are performed via Universal Plug and Play (UPnP) protocol.

20. The apparatus of claim 16, wherein the server notifies the network device of the incoming call and receives from the network device the indication via Universal Plug and Play (UPnP) protocol while the server forwards to the network device the incoming call through Session Initiation Protocol (SIP).

21. The apparatus of claim 16, wherein the server is further configured to:
receive, from the network device, a disconnect message for the incoming call generated by a Javascript Application Program Interface (API).

22. The apparatus of claim 16, wherein the apparatus is a cell phone.

23. The apparatus of claim 16, wherein the network device is a television.

24. The apparatus of claim 16, wherein the server is further configured to:
determine presence information for a set of users.

25. An apparatus, comprising:
a memory;
a processor; and
a client configured to:
receive, from a server located on a network device belonging to the same home network as the client, a notification of an incoming call in a packet switched network protocol received at the network device via an eventing mechanism of a first protocol;
present an interface to a user of the apparatus, the interface allowing the user to accept or reject the incoming call;
receive an indication from the user as to whether the user accepts or rejects the incoming call;
send the indication to the server; and
if the user accepts the incoming call, receive the incoming call from the server and initiate two way communications for the incoming call via a second protocol different than the first protocol, wherein the second protocol is a peer-to- peer signaling protocol.

26. The apparatus of claim 25, wherein communications between the apparatus and the network device are performed through Session Initiation Protocol (SIP).

27. The apparatus of claim 25, wherein communications between the apparatus and the network device are performed via Universal Plug and Play (UPnP) protocol.

28. The apparatus of claim 25, wherein the client receives from the server the notification and sends to the server the indication via Universal Plug and Play (UPnP) protocol while the client receives from the server the incoming call via Session Initiation Protocol (SIP).

29. The apparatus of claim 25, wherein the client is further configured to:
upon completion of the incoming call, generate a disconnect message with a Javascript Application Program Interface (API) and forward the disconnect message to the network device.

30. The apparatus of claim 25, wherein the client is further configured to:
receive, from the network device, presence information regarding a set of users; and
display the presence information to the user.

* * * * *